(12) United States Patent  
Sexton et al.

(10) Patent No.: US 8,837,739 B1
(45) Date of Patent: Sep. 16, 2014

(54) ENCRYPTION MESSAGING SYSTEM

(75) Inventors: Todd Sexton, San Diego, CA (US); Ersin Uzun, Mountain View, CA (US); Einar Mykletun, Aliso Viejo, CA (US)

(73) Assignee: Identillect Technologies, Inc., San Juan Capistrano, CA (US)

( * ) Notice: Subject to any disclaimer, the term of this patent is extended or adjusted under 35 U.S.C. 154(b) by 0 days.

(21) Appl. No.: 13/470,345

(22) Filed: May 13, 2012

(51) Int. Cl.
H04L 9/08 (2006.01)
H04L 29/06 (2006.01)
H04L 9/30 (2006.01)

(52) U.S. Cl.
CPC .............. H04L 9/08 (2013.01); *H04L 63/0442* (2013.01); *H04L 9/30* (2013.01)
USPC ............................ 380/282; 380/278; 380/285

(58) Field of Classification Search
None
See application file for complete search history.

(56) References Cited

U.S. PATENT DOCUMENTS

| | | | |
|---|---|---|---|
| 6,721,784 B1* | 4/2004 | Leonard et al. | 709/206 |
| 2001/0039616 A1* | 11/2001 | Kumagai et al. | 713/169 |
| 2001/0047222 A1* | 11/2001 | Wiesler et al. | 700/214 |
| 2005/0203855 A1* | 9/2005 | Malcolm | 705/64 |
| 2007/0269047 A1* | 11/2007 | Iwata | 380/268 |
| 2008/0006685 A1* | 1/2008 | Rackley III et al. | 235/379 |
| 2012/0198224 A1* | 8/2012 | Leclercq | 713/2 |

* cited by examiner

*Primary Examiner* — Kaveh Abrishamkar

(57) ABSTRACT

This invention provides a user friendly, email encryption system allowing users to send and receive encrypted messages for registered and unregistered users. Encrypted messages can be sent to registered or non-registered users by transmitting the encrypted message to cloud system servers. The cloud system servers acquire certificates from certificate authorities or any end-to-end exchange of keys between the sender and the recipient of the encrypted message. For registered users, messages sent by senders are encrypted by the sender and sent to the cloud system servers which decrypt the message and re-encrypt the message with the recipient's key. For non-registered users, once the encrypted message is decrypted at the cloud system servers, another message is sent to the non-registered informing them that an encrypted message awaits them if they select a link in the message which allows them to log into the cloud system servers and view the original message.

23 Claims, 11 Drawing Sheets

ENCRYPTION MESSAGING SYSTEM

BACKGROUND OF THE INVENTION

1. Field of the Invention

This invention provides an encryption system for electronic mail messages using symmetric and asymmetric key encryption. Specifically, this invention relates to the simplification of electronic mail encryption systems by users who have an encryption system installed as well as for those who do not have an encryption system installed.

2. Related Art

In recent years, electronic communication methods (email and text messaging systems, etc.) have enhanced users' communication while the volume of emails, video/audio and text based communications have rapidly expanded. As this expansion has occurred, there is a growing amount of information that is sent on unsecure networks. These unsecured data transmissions put at risk sensitive personal and/or commercial confidential information. As communication methodologies have expanded in both the number of users and the volume of messages transmitted, a need exists for a user friendly secure form of communication. One that preferably uses existing formats and easily allows users to send and receive encrypted data messages.

Despite advancements in cryptographic tools, many available communication security solutions exist today yet very few are widely deployed and actively used except when dealing with national security level secrets. The main obstacle preventing wide spread acceptance is problems relating to the establishment and exchange of encryption keys. Previous systems typically required senders to acquire public keys of the recipients in advance of the data transmission while other prior art solutions agree upon a symmetric shared key offline. An alternative prior art solution involves having both the sender and the receiver subscribing to a third party encrypted email solution provider. However, all these solutions required a substantial industrial coloration among email service providers, standards for key distribution systems, or substantial work from users to be able to send/receive encrypted emails. Thus a need exists for a user friendly scheme for senders to encrypt data transmissions and for recipients to easily decrypt the sent encrypted messages.

SUMMARY

This invention provides a user friendly, email encryption system that allows users to send and receive encrypted messages. Specifically, the encryption system allows registered users to send encrypted messages to other registered or even non-registered users by transmitting the encrypted message to cloud system servers. The cloud system servers does not require the acquisition of certificates from certificate authorities or any end-to-end exchange of keys between the sender and the recipient of the encrypted message. For registered users, the message sent by the sender is encrypted by the sender and sent to the cloud system servers which decrypt the message and re-encrypt the message with the recipient's key. For non-registered users, once the encrypted message is decrypted at the cloud system servers, another message is sent to the non-registered informing them that an encrypted message awaits them if they select a link in the message which allows them to log into the cloud system servers and view the original message.

By establishing such a methodology of transmitting encrypted data transmissions such as emails and text messages, the need to exchange public key information is no longer required. Instead, encryption system servers located in the cloud or accessible on by the internet contain the necessary keys of the sender and the recipients such that the messages may be encoded and decoded accordingly.

Encrypted messages are encrypted using state of the art algorithms thus ensuring the highest level of confidentiality of the encrypted message's content throughout the transmission process from the sender to the recipient. Unlike other systems, this encryption system provides for the sending of encrypted messages to anybody with a valid email address without requiring them to sign-up/subscribe to an encryption service or exchange public/private keys.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION

Figure 1:
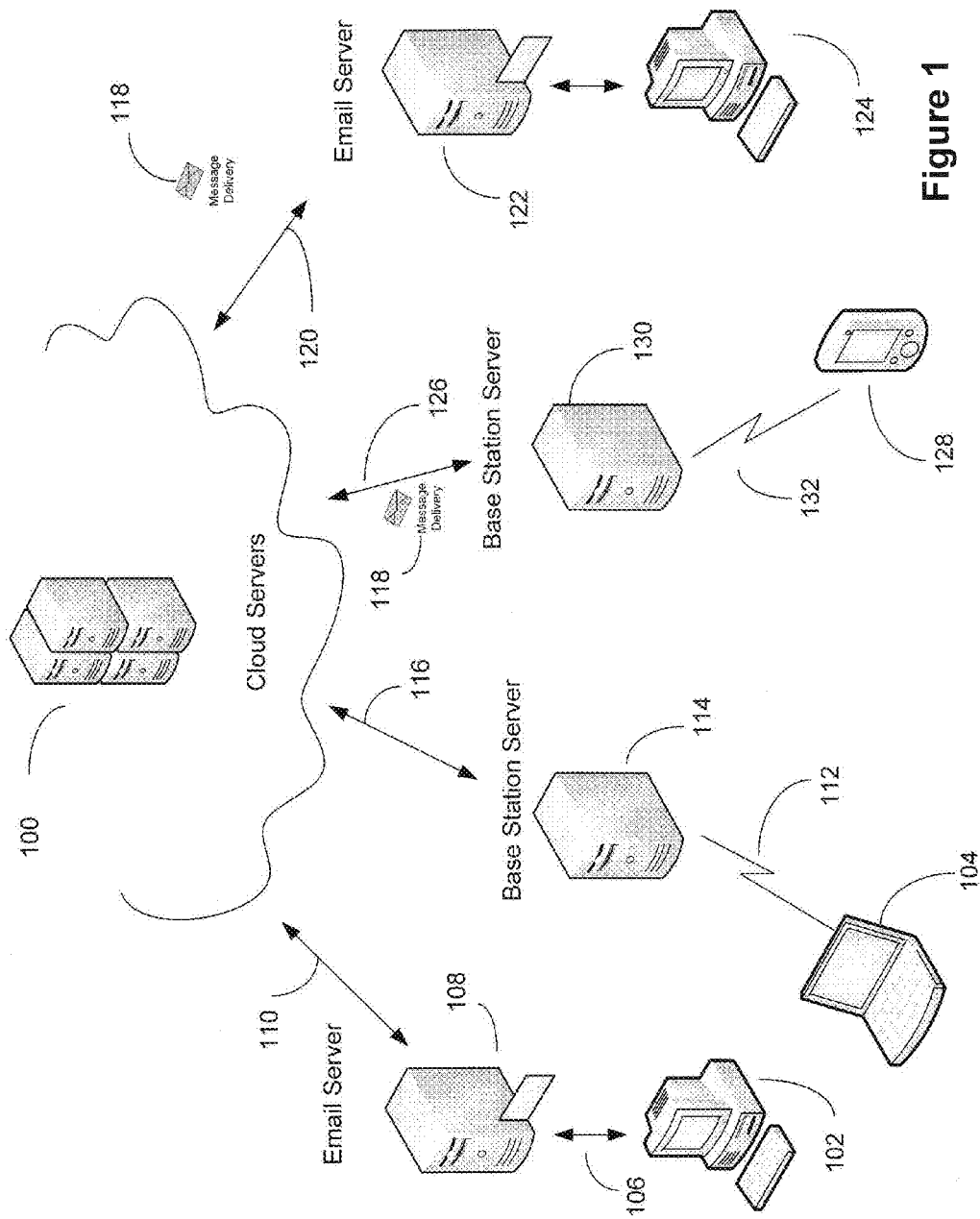
FIG. 1 is a schematic diagram illustrating the transmission of an encrypted email from a registered user to a registered recipient.
Figure 2:
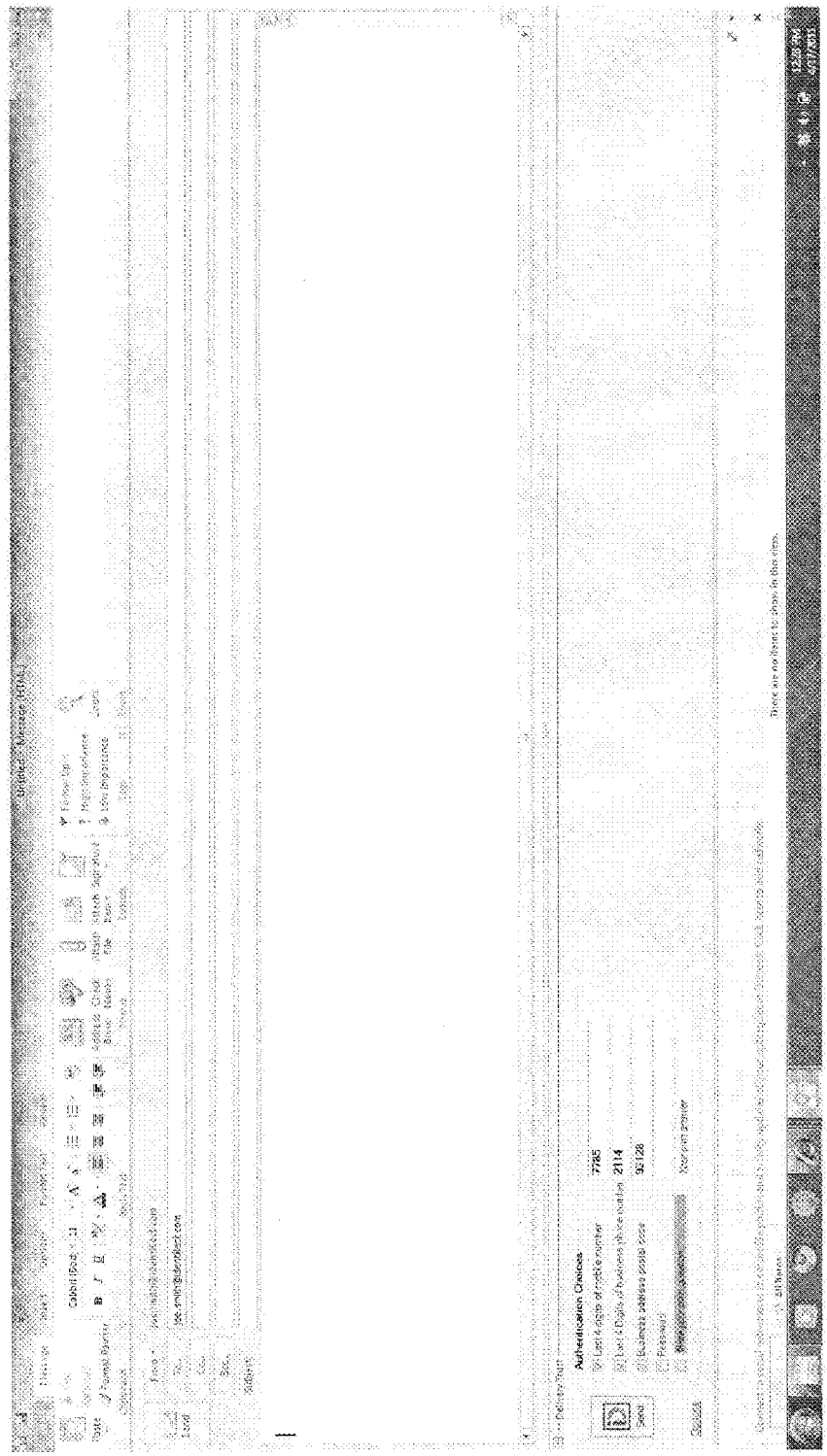
FIG. 2 is a screen shot of a message that auto-populates personal data regarding the recipient from the sender's contact database.

The invention provides a user friendly, secure data communication system. FIGS. 1 and 2 are block diagrams illustrate a high level, system architecture for a secure data communication system. FIG. 1 illustrates a plurality of registered users all capable of accessing a messaging system that can implement an encryption process such that senders of digital messages such as email, text, etc. can easily encrypt their messages and recipients can easily decrypt and view the encrypted message. The user can use the encryption system to send emails and text messages. However, current SMS messages are limited to 160 characters making encryption of SMS text messages impractical. If future systems expand the 160 character limitation, then this encryption system could be applied to SMS or other types of text messages. The secure messaging system operates when users interact with the encryption system servers (cloud based servers) 100.

Typically, users seeking to transmit encrypted messages to third parties register certain identifying information with the encryption system servers 100 and download plug in software code that can run on the operating system of a registered user's personal computer or sender's device 102 or on a sender's mobile device 104 such as a cellular phone, note pad with wireless capabilities or some other mobile communication device that can be connected to the encryption system servers 100 via the internet or a communication pathway.

Once registered, a user may connect 106 their computer or sender's device 102 to the internet via a gateway or an email server 108 that supports the transmission of emails 110 to and from the internet. If the registered user has a sender's mobile device 104, they will typically connect via a wireless path 112 to the internet a wireless gateway 114 such as a WiFi hot spot or if access is done on a cellular network, then by a base station server if access is accomplished on a 3G, 4G, a subsequent generation network, or some other mobile connectivity gateway. Once connected to the internet, the WiFi hotspot or cellular base station server will transmit and receive electronic messages 116 sent to or received from the encryption system servers 100.

Once an encrypted message is received from a registered user by the encryption system servers 100, the encrypted message is decrypted using the sender's key and encrypted again this time using the recipient's key. If a recipient of an encrypted message is registered with the encryption system servers 100, then the encryption system servers 100 generates a new message (email or text) addressed to the recipient and passes along the encrypted message 118 as an attachment to the new message (email or text). By sending the encrypted message 118 as an attachment to a new electronic message (email or text) generated by the encryption system servers 100, the entire encrypted message including the body of the encrypted message, any encrypted attachments, the subject line (if any) and the sender/recipient(s) information is encrypted as well, thus ensuring the highest level of confidentiality whenever an encrypted message is transmitted. It may not seem important to encrypt the subject line or the sender/recipient information, but significant information can be learned from a desired target by unauthorized observers from the analysis of message traffic where the number of emails and specific recipient(s) are identified when trying to learn more and crack an encryption system.

Another reason that the encrypted message is sent as an attachment is that encrypting an electronic message typically scrambles the text located in the message body. Many spam filters identify and tag such messages as spam potentially delaying delivery or causing the recipient to potentially delete an important encrypted email when thinking that the encrypted message is a junk spam message.

The encryption system servers 100 generate a new message 118 and send the new message on 120 to the email server 122 of the recipient 124. Likewise, if the message 118 is sent 126 to a mobile user 128 via the mobile base station server system 130 which then forwards the message 118 with the encrypted attachment to the mobile user 128 on the wireless link 132.

When the sender's device 102 or sender's mobile device 104 is a registered user with the encryption system servers 100, the plug in software code that is installed on the sender's computer allows the user to select whether the message such as an email will be sent encrypted or unencrypted. If the recipient 124 or 128 is also registered on the encryption system servers 100, then the sender does not need to do anything else to ensure that the recipient can read the encrypted email. However, if the email recipient 124 or 128 of an encrypted message is not registered on the encryption system servers 100, then the sender's device 102 or sender's mobile device 104 has several options.

First, the sender's device 102 or sender's mobile device 104 of the encrypted message can allow selected information to be pulled from the sender's contact list in their electronic address book. Examples of such selected information could require the recipient to enter their birthdate, last four digits of their cellular phone number, or the street number of their work address. FIG. 2 illustrates an automated function where the personal data from the recipient's information from the sender's contacts database is automatically populated into fields embedded in the message body. For enhanced security, multiple data questions may be selected asking the encrypted email recipient to answer multiple personal questions from the sender's contacts information. Alternative options may allow the encrypted email sender to select from a list or make up their own questions that only the recipient would know the answer which when the personal question was answered correctly the recipient would be able to read the encrypted message.

Additional security features available to the sender include restricting recipients from forwarding the message, printing the message or adding additional recipients to any response to an encrypted message. Other restrictions may include setting the lifetime of the email such that encrypted email is automatically is deleted after a specific period of time has elapsed, e.g. one day, three days, thirty days, etc. Setting the encrypted message's lifetime could apply to only unsubscribed users or to both registered users and non-member users.

Figure 3:
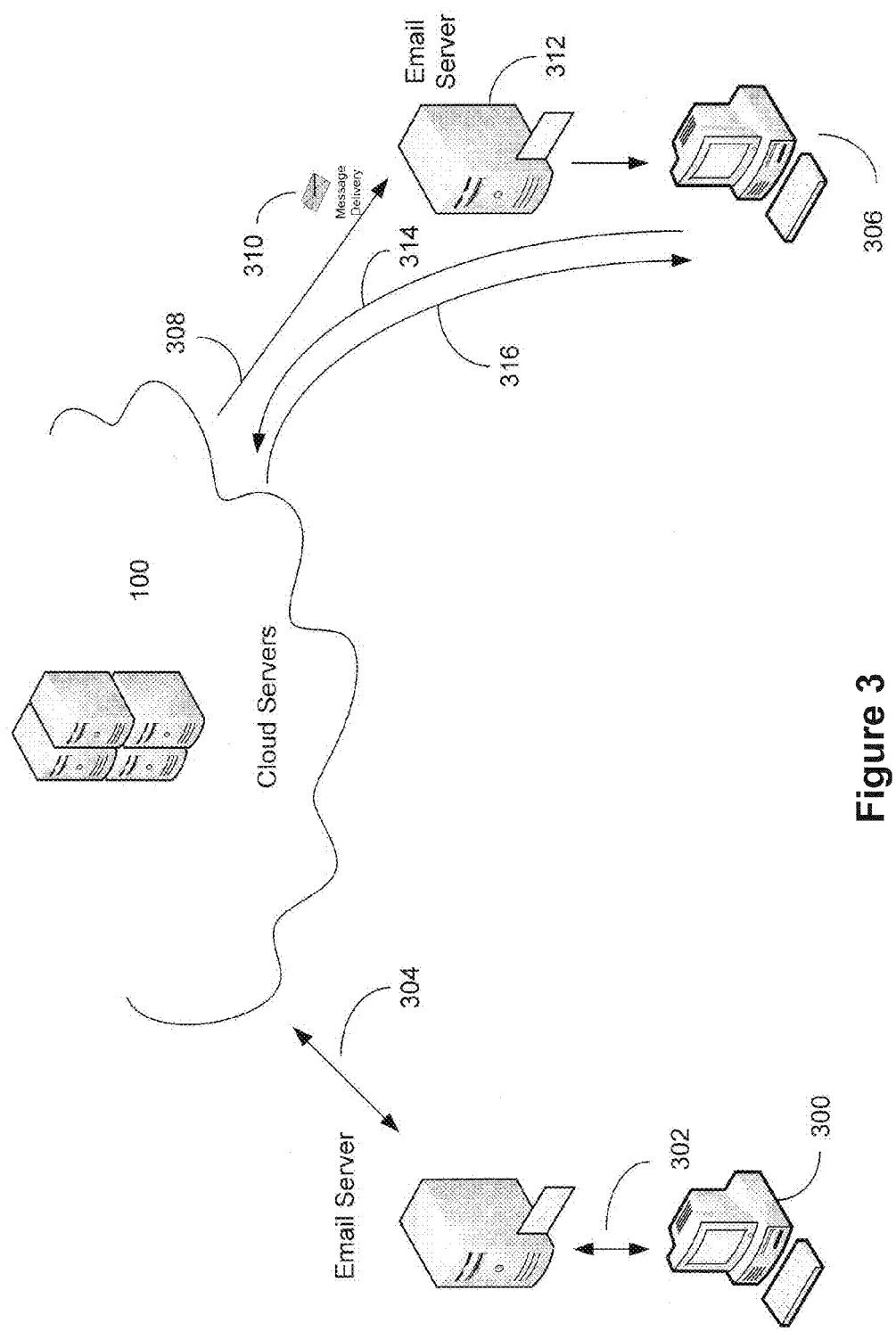
FIG. 3 is a schematic diagram illustrating the transmission of an encrypted message from a registered user to a user who is not registered with the encryption system servers.

FIG. 3 illustrates the scenario where the sender 300 is registered with the encryption system servers 100 and transmits an encrypted message to a recipient who is not registered with the encryption system servers 100. In such a situation, the sender 300 selects the encryption feature enabled by the email plug in software and the encrypted message is sent to the sender's email server or internet gateway 302. The encrypted message is then routed 304 to the encryption system servers 100 located on the cloud and accessible by users. Once the encrypted message is received by the encryption system servers 100, the encrypted message is decrypted and the recipients are identified as unregistered on the encryption system servers 100. When this happens, the encrypted message is not forwarded to the recipient(s) 306 as an attachment. Instead, the encryption system servers 100 generate a new message 310 and sends that message to the recipient 306. This new message 310 comprises an embedded web link that when selected by the recipient will take the to the encrypted system servers 100 for authentication. If the recipient 306 was listed in the sender's 300 contact database or electronic address book, then one or more questions are generated seeking correct responses from the recipient 306.

If the recipient cannot answer the questions, then access to the encrypted message is denied. In some instances, the sender 300 may have outdated personal contact information of the recipient 306. In such cases, the recipient 306 may generate a message to the sender 300 informing the sender 300 that the recipient 306 cannot access the encrypted message 310.

If the encrypted message 310 is delivered to the recipient 306, then the new message 310 contains a link that when selected 314 by the recipient 306, the user is taken to a webpage 316 where the recipient 306 will have to answer one or more security questions (e.g. last four digits of their office telephone number, birthdate, home address, etc.) to authenticate the person as the actual intended recipient 306. Once the recipient 306 is authenticated, the encrypted e-mail may be displayed to the recipient 306. For added security, if the recipient 306 is not registered with the encryption system servers 100, additional restrictions can be implemented such that the recipient may not be able to forward, print or add additional recipients on any reply sent to the sender 300 and the encrypted message is kept at the encryption servers 100 for a sender defined life. When the life of the encrypted message 310 expires, the message 310 is deleted from the encryption system servers 100 and/or the recipient device.

Figure 4:
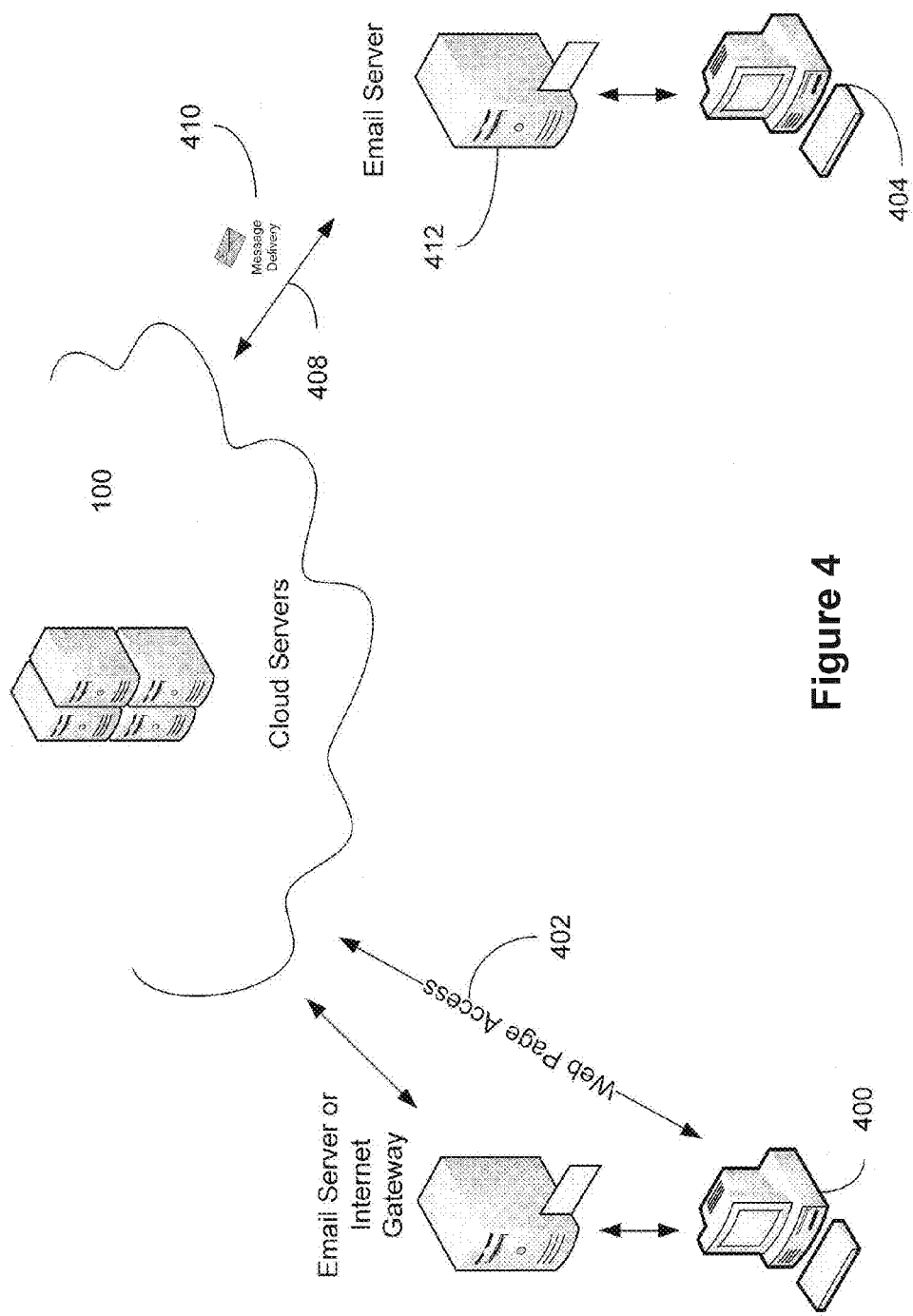
FIG. 4 is a schematic diagram illustrating the transmission of an encrypted message from a registered user who is unable to access their computer and is accessing a third party's computer that does not have the user's encryption key.
Figure 5:
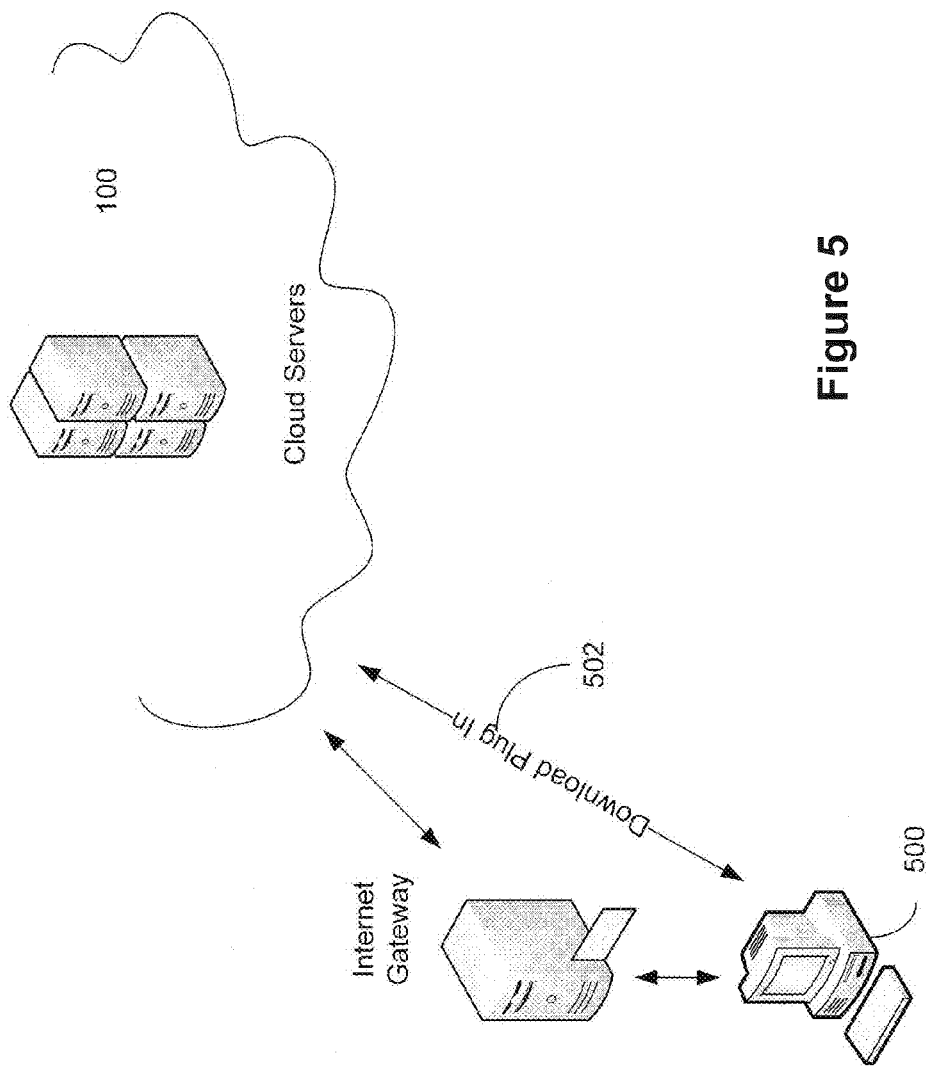
FIG. 5 is a schematic diagram illustrating the registration of a user so that encrypted messages may be sent.

FIG. 4 illustrates a scenario when the sender 400 is not using a computer that has the plug in software downloaded and installed on their computer 400. In some instances, a registered user may only have access to public computer or a family member's computer where it is impossible or impractical to download and install the encryption system servers 100 plug in software code. In those instances, the registered user 400 will access the encryption system servers 100 via a secure webpage 402.

From the secure web page access, the user 400 can access their messaging system and replicate the process of sending and receiving encrypted messages. Copies of previous emails as well as new emails may be stored at the encryption system servers 100 allowing the registered user to access their messaging systems and continue to send and receive encrypted messages even when they are on a public computer. Here, the registered user 400 accesses the encrypted system servers 100 and sends an encrypted email to a desired recipient 404. The encrypted system servers 100 determine whether the recipient 404 is a registered user or an unregistered user. If the recipient is a registered user, the encrypted message 410 is sent 408 via the same process as described in FIG. 1. If the recipient is an unregistered user then the encrypted email is sent via the process as described in FIG. 3.

The encryption system servers 100 may be configured so that all messages sent by a registered user may be archived on the encryption system servers 100. Alternatively, the system could be configured so that only encrypted messages are stored on the encryption system servers 100. However, in many instances, the encryption system servers 100 would store a copy of a message in both the registered sender's email account (corporate or private account such as gmail, Yahoo mail, Hotmail, etc.) as well as on the encryption system servers 100 account. Alternatively, an option could be configured so that an encrypted message is not saved in the corporate or personal email accounts of the registered user but is saved on the encryption system server 100.

Figure 6:
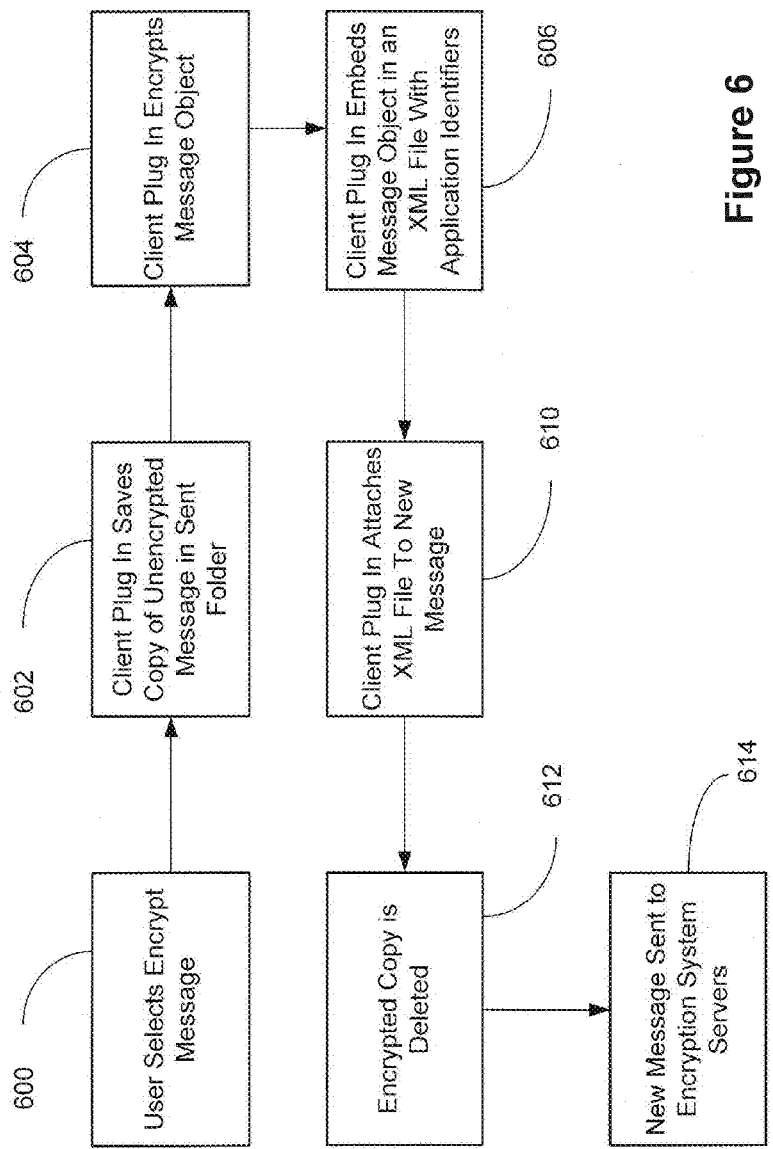
FIG. 6 is a block diagram illustrating the interface of the registered user's plug in software with the registered user's messaging software when sending encrypted messages.

FIG. 6 is a block diagram illustrating the sending of messages and the actions of the plug in software. When the user selects to encrypt a message 600, the user's plug in software saves a copy of the unencrypted message in the sent folder 602. The plug in next encrypts the message object 604 and embeds the message object in an XML file with application identifiers 606. The plug in then attaches the XML file to a new message 610 which is sent to the encryption system servers 100. The encrypted copy is then deleted 612 and the new message is sent to the encryption system servers 100.

Figure 7:
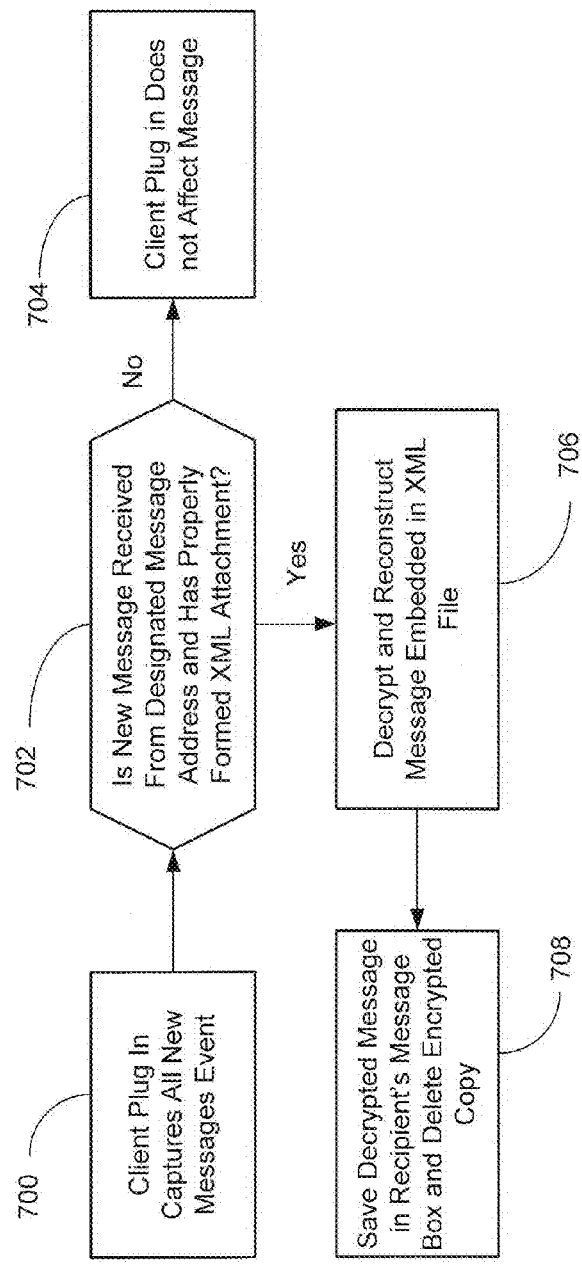
FIG. 7 is a block diagram illustrating the interface of the registered user's plug in software with the registered user's messaging software when receiving encrypted messages.

FIG. 7 is a block diagram illustrating the receipt of encrypted messages. The plug in 700 captures all new message events 700. Any new messages that are received are analyzed as to whether the new message has a properly formatted XML attachment. If the determination confirms that that the new message does not have a properly formatted XML file, then the messaging system handles the message as it does with any unencrypted messages and the plug in does not affect the message 704. If the determination confirms that the new message has a properly formatted XML message, then the plug in decrypts and reconstructs the message embedded in the XML file 706. The plug in then saves the decrypted message in the recipient's message box and deletes the encrypted copy 708.

Figure 8:
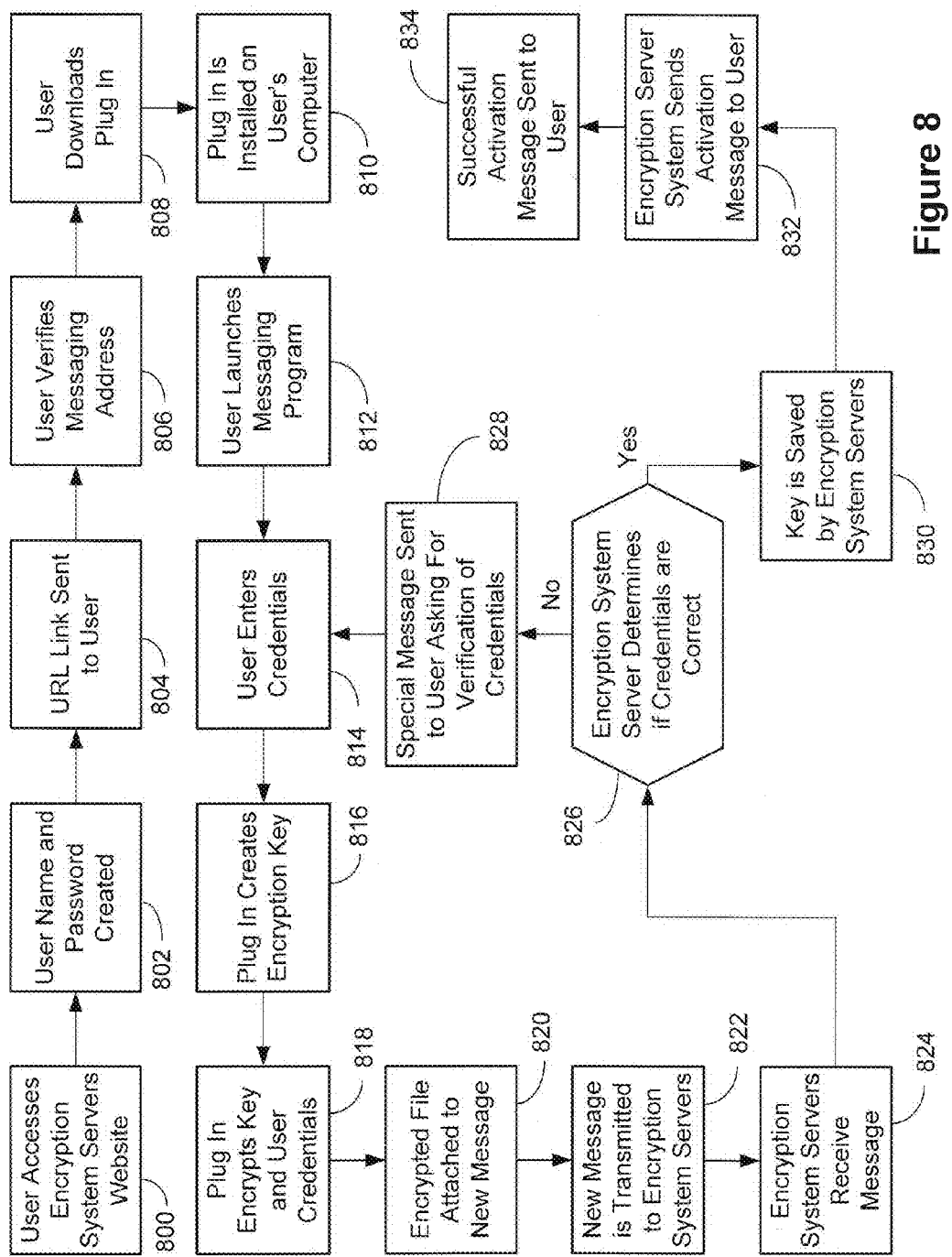
FIG. 8 is a block diagram illustrating registration process of a user.

FIG. 8 is a block diagram of the registration process of a user. The encryption system may be implemented as a client server type system. This encryption system provides for integration into common email clients systems via installation of plug in software code and can be accessible over HTTPS systems using any web browser on either the sender or the receiver side end. The encryption system may reside on the Internet cloud and is accessible to anyone connected to the internet. The user interfaces provided through the plug in software will provide the encryption functionality via the selection of an electronic button tool on the sender side and unobtrusive decryption methodology on the receiver side. Once a message is encrypted, the communication between the sender and receiver and the encryption system servers may be tunneled using Transport Layer Security ("TLS").

First, the user accesses the encryption system servers' website 800. The user creates a user name and password 802 and a URL is sent by the encryption system servers' website to the user 804. The user then verifies the messaging address 806 allowing the user to download the software plug in 808. The user can then install the software plug in on the user's computer 810. If the user has multiple computers, then the user may need to install the plug in for each device. This will allow for the creation of multiple keys associated with that particular registered user. The encryption system servers can manage the multiple encryption/decryption keys. In an ideal environment, the encryption system servers may be configured to association one encryption/decryption key per user and may be able to track the multiple devices that the registered user uses to access their messaging accounts.

The encryption key may be generated by a key derivation algorithm that outputs fixed length key given all or some of the following information as input:
1. contact and personal information about the recipient that is automatically pulled from the sender's contacts database and/or other relevant information from a third party social communication sites (e.g., LinkedIn, Facebook, Orkut, etc.) that is accessible by the sender;
2. answer custom security questions the sender has created to authenticate the recipient; and/or
3. enter a password that the sender shares with the recipient.

Note that a random symmetric key can be used to encrypt the email and that key can be encrypted n times using n different keys that are generated by feeding n different subsets of the information explained above to the key derivation algorithm. This way, the email can be successfully decrypted even if the recipient can only reconstruct one subset correctly.

After the plug in software is downloaded and installed 810, the next time the user launches their messaging software tool 812 (e.g., Microsoft Outlook, Mozilla Thunderbird, Apple Entourage, etc.), the user is prompted to enter their credentials 814. The plug in then creates a symmetric or asymmetric key 816, encrypts the key and user credentials 818 before attaching the encrypted key and user credentials to a new message 820.

The new message with the attached encrypted user key and credentials is transmitted to the encryption system servers 822. Once received by the encryption system servers 824, the encryption system server determines whether the user's credentials are correct 826 comparing the input to the already registered information. If the authentication fails, a special message is sent to the user 828 asking for re-entry of the credentials. If the authentication process is a success, the user's key or keys in a multi-key situation are saved 830 and the encryption system servers send an activation message to the user 832. When the activation message 832 is received by the user's computer, the activation is successful 834.

Figure 9:
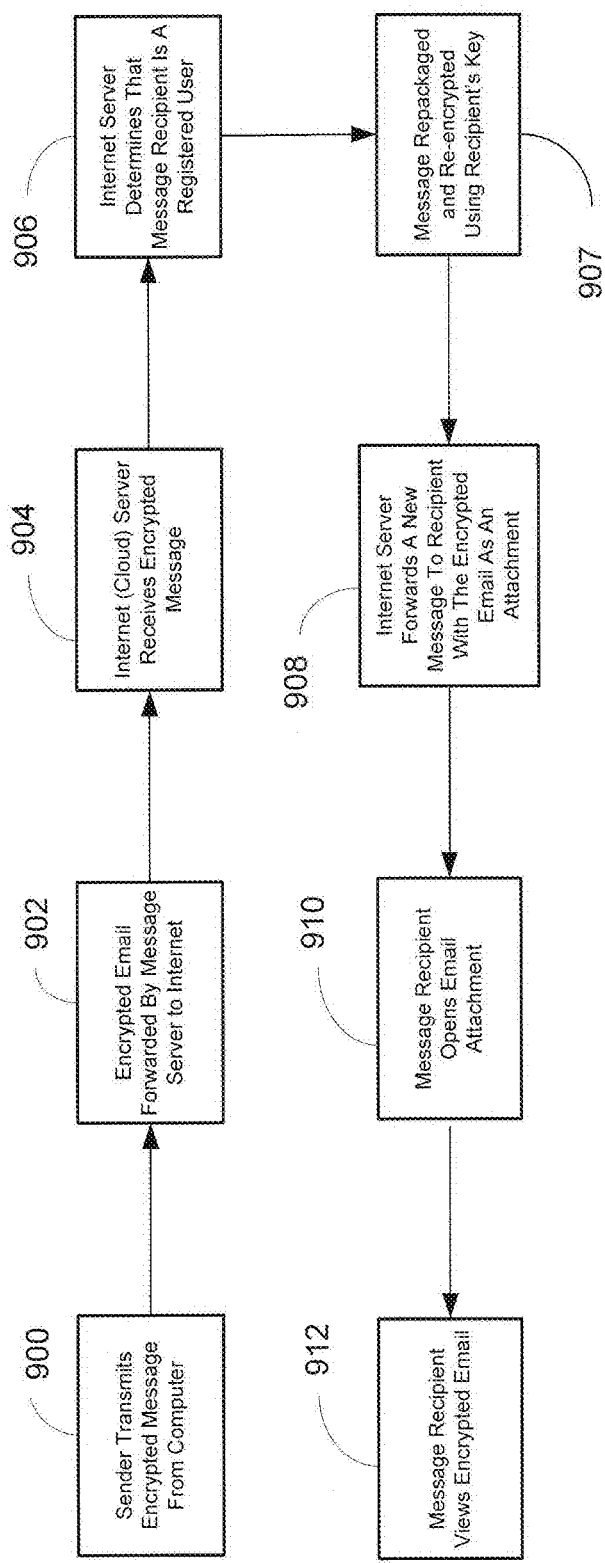
FIG. 9 is a block diagram illustrating the transmission of an encrypted message.

FIG. 9 is a block diagram of the process in sending an encrypted message. The sender generates, encrypts and sends a message on their computing device (computer, laptop, smart phone, tablet, etc.) 900. The encrypted message is sent along with associated identifiers (e.g., labels, custom security question, etc.) about inputs fed into the key derivation algorithm to the recipient carried in an enveloping encrypted message. The encrypted message forwarded 902 by a communication network such as the internet to the encryption system servers 904. The encryption system servers decrypt the incoming encrypted message using the sender's encryption/decryption key. The recipient's information is then compared to the information regarding other registered users and if the recipient is also a registered user 906, a new message is generated with the encrypted message, associated information such as the subject matter title and recipient address encrypted using the recipient's key and attached to the new message as an attachment. The message is repackaged and re-encrypted using the recipient's key 907.

The encryption system servers then send the new message to the recipient 908. Upon receiving the encrypted enveloping message, the recipient's messaging software or a plug in may check to determine whether it has all the required information that was fed to the key derivation algorithm by the sender and saved in an accessible storage medium 910. If not, the messaging software or the plug in may prompt the recipient of the encrypted message to enter the missing information and may optionally store this information for future use. When all the required inputs are complete, they are fed into the key derivation algorithm thus generating the same symmetric or asymmetric key the sender used to encrypt his email and the original message is decrypted and the recipient can view the decrypted message 912.

Figure 10:
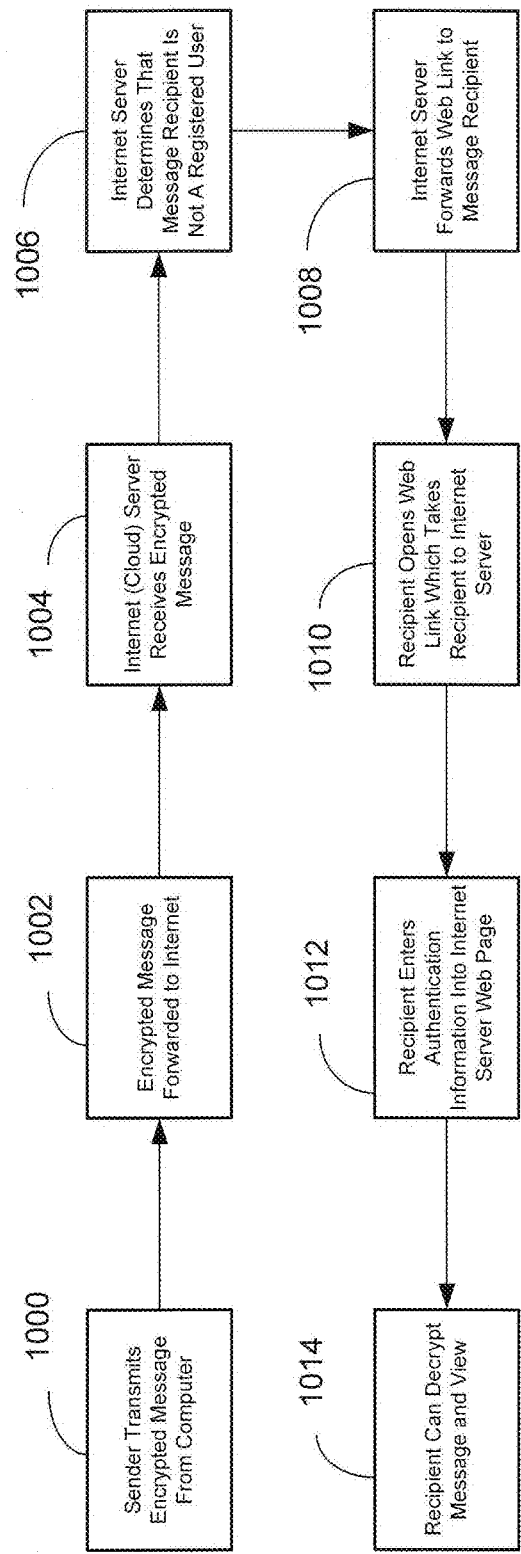
FIG. 10 is a block diagram illustrating the receipt of an encrypted message by an unregistered recipient.

FIG. 10 is a block diagram of the process in sending an encrypted message. The sender generates, encrypts and sends a message on their computing device (computer, laptop, smart phone, tablet, etc.) 1000. The encrypted message is sent along with associated identifiers (e.g., labels, custom security question, etc.) about inputs fed into the key derivation algorithm to the recipient carried in an enveloping encrypted message. The encrypted message forwarded 1002 by a communication network such as the internet to the encryption system servers 1004. The encryption system servers decrypt the incoming encrypted message using the sender's encryption/decryption key. The recipient's information is then compared to the information regarding other registered users and if the recipient is also a registered user 1006. If the recipient is not a registered user, a new message is generated by the encryption system servers with an embedded URL link and sent to the recipient 1008. Upon receiving the URL link, the recipient can click on the URL link which will take them to the encryption system servers' website page where the recipient is prompted to enter information authenticating the recipient 1012 and the recipient can view the originally encrypted message 1014.

Additional features that may be incorporated into the encryption process include the implementation of a save secure folder. A save secure folder is a special folder created to store sensitive messages. Whenever a registered user implements the save secure folder, any messages that are placed into the save secure folder are automatically encrypted. The registered user may select to have the plug in software continuously or periodically monitor the save secure folder on the outlook data file. If there are any messages that are not previously encrypted, the save secure folder examined by the plug in software will encrypt the message and save the encrypted message while deleting the unencrypted copy of the message. This deletion process may be configured by the registered user so that the deleted message is also deleted from the delete folder as well so that the only copy that exists is in encrypted form.

The encryption process may implement a symmetric or asymmetric encryption key. Typically a symmetric encryption key is used. Messages encrypted using the plug in software typically are in a particular format in that they have an attachment XML file that contains the original email in an encrypted form. So, the plug in periodically reviews the messages in the folder and looks for any messages that are not in that format. When this occurs, the message is encrypted and the unencrypted message is deleted. These messages are unencrypted during runtime by the plug in software and are typically stored in an encrypted form on user's computer or in the users encryption system servers 100 messaging account. Optionally, a registered user may choose an automated message to be generated and sent to the sender of those messages that are put in the save secure folder indicating that the message is being stored securely as it has potentially sensitive data and for safety purposes have elected to store the message in an encrypted form.

Another feature that may be implemented is one that automatically evaluates messages prior to being sent for confidential or potentially sensitive information and warns the registered user inquiring as to whether the intended message should be sent in an encrypted format. The automatic evaluation is based on user defined rules that are based on regular expressions. For example, any word, string, number or even character strings that fits into a certain pattern or simply anything that can represented by regular expressions (see http://en.wikipedia.org/wiki/Regular_session or http://regexlib.com/ for many examples on how common patterns for things like phone numbers, email addresses, social security numbers etc. are written by regular expressions). A user may just choose to monitor messages and their attachments for certain words (e.g., confidential, ssn, HIV) or more general expressions such as numbers written in social security number format (e.g., xxx-yy-zzz or ^\d{3}-\d{2}-\d{4}$). If the message or any of its attachments has information captured by those rules and if that message is being sent unencrypted, the plug in displays a warning message to the user prior to the message leaving the user's computer. In the warning dialog, the plug in may highlight the part(s) of the message body or its attachments that triggered the warning and asks the user to evaluate and determine if the message should be protected by encryption prior to transmission.

This encryption system could also be used to encrypt packetized voice or video messages. However, latency issues with encryption and decryption processes create bottlenecks that may impede commercial implementation until there is faster processing of the instructions allowing for higher use of processing power. However, improved microprocessor and network performance may eliminate or ease such bottlenecks allowing for easy implementation of encryption and decryption of packetized voice or video messages.

Figure 11:
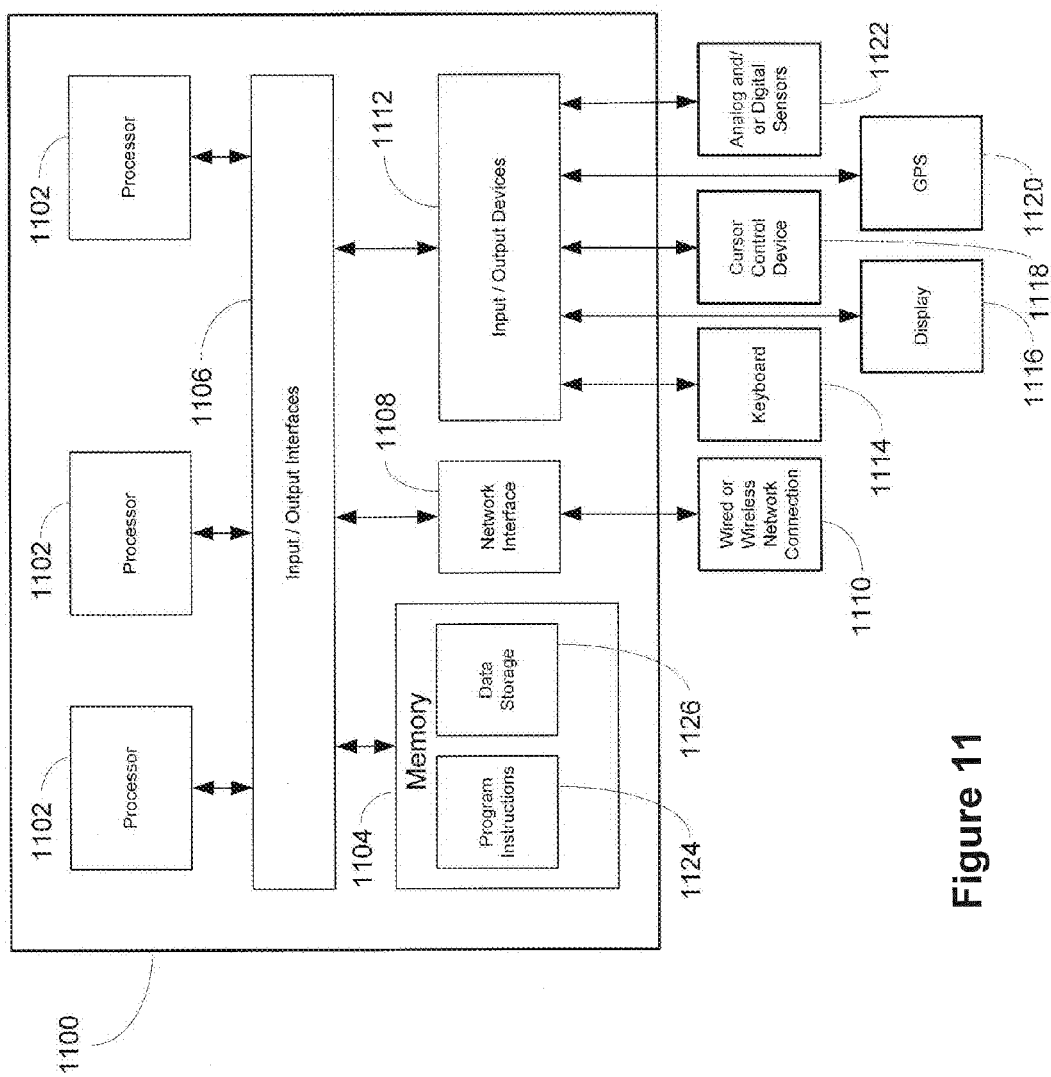
FIG. 11 is a block diagram of a computer system layout for executing software instructions that support an encryption messaging system.

Various embodiments of an encryption messaging process such as one for sending encrypted emails may be performed based on input of software instructions executed on at least one processor such as on the computer system is illustrated by FIG. 11. Accordingly, in FIG. 1 a plurality of computer systems 1100 may be used to implement the encryption messaging process system. Computer system 1100 may be implemented at each node from the sender's device 102, the email server 108, the cloud servers 100, email server 122 to the recipient's device 124. Similarly, in a mobile environment computer system 1100 may be used to implement the sender's mobile device 104, the base station server 114, the cloud servers 100, the base station server 130 and the recipient's mobile device 128.

The computer system 1100 may include one or more processors or processor cores 1102 that are connected to and interface with a system memory 1104 via an input/output (I/O) interface 1106. The computer system 1100 further includes a network interface 1108 coupled to I/O interface 1106 and connected to a wired or wireless network connection 1110. Also connected to the input/output device 1106 may be one or more input/output devices 1112, such as keyboard 1114, display(s) 1116, cursor control device 1118, a global positioning system ("GPS") 1120, audio device (not shown), analog and/or digital sensors 1122 and/or some other device. In some embodiments, it may be contemplated that may need to be implemented using a single instance of a computer system 1100, while in other embodiments multiple systems 1100 may be included, or multiple nodes making up the computer system 1100, may be configured to host different portions or instances of the embodiments. For example, in one embodiment some elements may be implemented via one or more nodes of computer system 1100 that are distinct from those nodes implementing other elements.

In various embodiments, the computer system 1100 may be a uniprocessor system including only one processor 1102 or processor core, or a multiprocessor system including a plurality of processors or processor cores 1102. Processors 1102 may be any suitable processor capable of executing instructions. For example, in various embodiments, processor(s) 1102 may be general-purpose or embedded processors implementing any of a variety of instruction set architectures (ISAs), such as the x86 (e.g. x86, x86-32, x86-64, and subsequent generations), PowerPC or Power ISA architectures, Reduced Instruction Set Computer ("RISC"), Complex Instruction Set Computer ("CISC"), Scalable Processor Architecture ("SPARC"), or Microprocessor without Interlocked Pipeline Stages ("MIPS") architecture, or any other suitable ISA, including derivative versions of this list or new architectures that may displace this list. In multiprocessor systems, each of the processors 1102 may commonly, but not necessarily, implement the same ISA.

System memory 1104 may be configured to store program instructions and/or data accessible by the processor(s) 1110. In various embodiments, the system memory 1104 may be implemented using any suitable memory technology, such as static random access memory (SRAM), synchronous dynamic RAM (SDRAM), nonvolatile/Flash-type memory, phase change, or any other type of memory. In the illustrated embodiment, program instructions and data implementing desired functions, such as those described for providing an encryption messaging system are shown stored within the system memory 1104 as program instructions 1124 and data storage 1126, respectively. In other embodiments, the program instructions and/or data may be received, sent or stored upon different types of computer-accessible media or on similar media separate from system memory 1104 or the computer system 1100. Generally speaking, a computer-accessible medium may include storage media or memory media such as magnetic or optical media, e.g., optical disks such as CDs, DVD-ROM or other variants coupled to the computer system 1100 via the I/O interface 1106. The program instructions and data stored via a computer-accessible medium may be transmitted by transmission media or signals such as electrical, electromagnetic, optical or digital signals, which may be conveyed via a communication medium such as a network and/or a wired or wireless link, such as may be implemented via network interface 1108.

In one embodiment, the I/O interface 1106 may be configured to coordinate I/O traffic between the processor(s) 1102, the system memory 1104, and any peripheral devices including network interface 1108 or other peripheral interfaces, such as the input/output devices 1112. In other embodiments, the I/O interface 1106 may perform any necessary protocol, timing or other data transformations to convert data signals from one component (e.g., system memory 1104) into a format suitable for use by another component (e.g., processor 1102). In still other embodiments, the I/O interface 1106 may include support for devices attached through various types of peripheral buses, such as a variant of the Peripheral Component Interconnect ("PCI") bus standard, the Universal Serial Bus ("USB") standard, or any other similar peripheral bus standard. In some embodiments, the function of the I/O interface 1106 may be split into two or more separate components, such as a north bridge and a south bridge. In addition, in some embodiments some or all of the functionality of the I/O interface 1106, such as an interface to system memory 1104, may be incorporated directly into the processor(s) 1102.

The network interface 1108 may be configured to allow data to be exchanged between the computer system 1100 and other devices attached to a network, such as other computer systems, or between nodes of computer system 1100. In various embodiments, the network interface 1108 may support communication via wired or wireless general data networks, such as any suitable type of Ethernet network, via telecommunications/telephony networks such as analog voice networks or digital fiber communications networks; via storage area networks such as Fibre Channel SANs, or via any other suitable type of network and/or protocol.

Input/output devices 1112 may, in some embodiments, include one or more display terminals, keyboards, keypads, touchpads, scanning devices, voice or optical recognition devices, analog or digital sensors 1122 or any other devices suitable for entering or retrieving data by one or more computer system 1100. Multiple input/output devices 1112 may be present in the computer system 1100 or may be distributed on various nodes of the computer system 1100. In some embodiments, similar input/output devices may be separate from the computer system 1100 and may interact with one or more nodes of the computer system 1100 through a wired or wireless connection, such as over a network interface 1108.

As shown in FIG. 11, the memory 1104 may include program instructions 1124, configured to implement embodiments providing an encryption messaging system and related data storage 1126, comprising various data accessible by the program instructions 1124. In one embodiment, the program instructions 1124 may include software elements for providing the encryption messaging system as illustrated in FIGS. 1 and 10. The data storage 1126 may include data that may be used in some of the embodiments while in other embodiments the different software elements and data may be included.

To those skilled in the art will appreciate that computer system 1100 is merely illustrative and is not intended to limit the scope of a software methodology for providing an encryption messaging system. In particular, the computer system 1100 and the Input/Output devices 1112 may include any combination of hardware or software that can perform the indicated functions, including computers, network devices, internet appliances, PDAs, wireless phones, pagers, etc. The computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or in storage while being used, these items or portions of them may be transferred between memory and other storage devices for purposes of memory management and data integrity. Alternatively, in other embodiments some or all of the software components may execute in memory on another device and communicate with the illustrated computer system 1100 via inter-computer communication. Some or all of the system components or data structures may also be stored (e.g., as instructions or structured data) on a computer-accessible medium or a portable article to be read by an appropriate drive. In some embodiments, instructions stored on a computer-accessible medium separate from computer system 1100 may be transmitted to the computer system 1100 via transmission media or signals such as electrical, electromagnetic, or digital signals, conveyed via a communication medium such as a network wired and/or wireless link. Various embodiments may further include receiving, sending or storing instructions and/or data implemented in accordance with the foregoing description upon a computer-accessible medium. Accordingly, the invention may be practiced with other computer system configurations, including derivatives of future systems to the ones described here.

The various embodiments may further include receiving, sending or storing instructions and/or data implemented in accordance with the foregoing description of a computer-accessible medium. Generally speaking, a computer-accessible medium may include storage media or memory media such as magnetic or optical media, e.g., disk or CD-ROM, DVD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Once a message is decrypted, it can be stored unencrypted in the user's email account. This is often a requirement by some IT managers who want access to the unencrypted email when it is stored on the client's server in order to comply with the client's internal IT guidelines.

While various embodiments of the invention have been described, it will be apparent to those of ordinary skill in the art that many more embodiments and implementations are possible that are within the scope of this invention.

What is claimed is:

1. A public key encryption system, comprising the steps of:
generating a first message having content and encrypting the first message with a sender key;
generating a second message where the encrypted first message is an attachment to the second message;
sending the second message to a cloud based server prior to delivery to a recipient;
decrypting the content of the encrypted first message at the cloud based server using the sender key;
generating a third encrypted message with a recipient's key at the cloud based server that comprises the decrypted contents of the first message;
generating a third message at the cloud based server where the first decrypted message is encrypted with the recipient's key and attached to a fourth message; and
sending the fourth message to the recipient.

2. The public key encryption system of claim 1, further comprising authenticating the recipient of the fourth message with information known by the recipient.

3. The public key encryption systems of claim 1, where the recipient can authenticate themselves and access the first encrypted message based on information known to the recipient.

4. The public key encryption systems of claim 3, where the information about the recipient includes at least four digits of the recipient's mobile number.

5. The public key encryption systems of claim 3, where the information about the recipient includes of the recipient's street address.

6. The public key encryption systems of claim 3, where the information about the recipient includes at least four digits of the recipient's telephone number.

7. The public key encryption systems of claim 3, where the information about the recipient includes a password.

8. The public key encryption systems of claim 1, where the encryption system is a plug in software module into a sender's email software.

9. The public key encryption systems of claim 1, where the sender of the encrypted first message restricts the recipient from printing the first message.

10. The public key encryption systems of claim 1, where the sender of the encrypted first message restricts the recipient from forwarding the first message.

11. The public key encryption systems of claim 1, where the sender of the encrypted first message restricts the recipient from adding recipients in a reply to the contents of the first message.

12. The public key encryption systems of claim 1, where the sender of the encrypted first message creates a life period for the content so that at the end of the life period the content is deleted.

13. A public key encryption system, comprising the steps of:
generating a first message having content and encrypting the first message with a sender key;
generating a second message where the encrypted first message is an attachment to the second message;
sending the second message from a sender to a cloud based server prior to delivery to a recipient;
decrypting the first message at the cloud based server using the sender key;
generating a third message at the cloud based server that contains an embedded link allowing the recipient to connect to the cloud based server so that the encrypted first message can be accessed; and
sending the third message from the cloud based server to the recipient.

14. The public key encryption systems of claim 13, further comprising accessing the cloud based server by the recipient, authenticating the recipient and allowing the recipient to access the first encrypted message based on information known to the recipient.

15. The public key encryption systems of claim 14, where the information about the recipient includes at least four digits of the recipient's mobile number.

16. The public key encryption systems of claim 14, where the information about the recipient includes of the recipient's street address.

17. The public key encryption systems of claim 14, where the information about the recipient includes at least four digits of the recipient's telephone number.

18. The public key encryption systems of claim 14, where the information about the recipient includes a password.

19. The public key encryption systems of claim 13, where the encryption system is a plug in software module into a sender's email software.

20. The public key encryption systems of claim 13, where the sender of the encrypted first message restricts the recipient from printing the first message.

21. The public key encryption systems of claim 13, where the sender of the encrypted first message restricts the recipient from forwarding the first message.

22. The public key encryption systems of claim 13, where the sender of the encrypted first message restricts the recipient from adding recipients in a reply to the contents of the first message.

23. The public key encryption systems of claim 13, where the sender of the encrypted first message creates a life period for the content so that at the end of the life period the content is deleted.

* * * * *